(12) United States Patent
Jeong et al.

(10) Patent No.: US 10,410,787 B2
(45) Date of Patent: Sep. 10, 2019

(54) COIL MODULE AND WIRELESS POWER TRANSMISSION DEVICE USING THE SAME

(71) Applicant: WITS CO., Ltd., Yongin-si, Gyeonggi-do (KR)

(72) Inventors: In Wha Jeong, Suwon-si (KR); Ki Hong Kim, Suwon-si (KR); Young Woon Choi, Suwon-si (KR); Young Seung Roh, Suwon-si (KR)

(73) Assignee: WITS Co., Ltd., Gyeonggi-do (KR)

( * ) Notice: Subject to any disclaimer, the term of this patent is extended or adjusted under 35 U.S.C. 154(b) by 72 days.

(21) Appl. No.: 15/800,957

(22) Filed: Nov. 1, 2017

(65) Prior Publication Data

US 2018/0254142 A1 Sep. 6, 2018

(30) Foreign Application Priority Data

Mar. 3, 2017 (KR) ........................ 10-2017-0027827

(51) Int. Cl.
| | |
|---|---|
| *H01F 27/42* | (2006.01) |
| *H02J 50/12* | (2016.01) |
| *H02J 7/02* | (2016.01) |
| *H02M 7/537* | (2006.01) |
| *H01F 27/28* | (2006.01) |
| *H01F 3/10* | (2006.01) |
| *H01F 5/00* | (2006.01) |
| *H01F 38/14* | (2006.01) |
| *H02M 7/48* | (2007.01) |

(52) U.S. Cl.
CPC ............... *H01F 27/42* (2013.01); *H01F 3/10* (2013.01); *H01F 5/003* (2013.01); *H01F 27/28* (2013.01); *H01F 27/2804* (2013.01); *H01F 38/14* (2013.01); *H02J 7/025* (2013.01); *H02J 50/12* (2016.02); *H02M 7/537* (2013.01); *H01F 2003/106* (2013.01); *H02M 2007/4818* (2013.01); *Y02B 70/1441* (2013.01)

(58) Field of Classification Search
CPC .......... H02J 50/12; H02J 7/025; H02M 7/537; H02M 2007/4818; Y02B 70/1441
See application file for complete search history.

(56) References Cited

U.S. PATENT DOCUMENTS

| 2013/0134794 A1 | 5/2013 | Lee et al. |
| 2015/0236545 A1 | 8/2015 | Hyun et al. |

FOREIGN PATENT DOCUMENTS

| JP | 2013-219791 A | 10/2013 |
| KR | 10-2013-0058423 A | 6/2013 |
| KR | 10-2014-0044022 A | 4/2014 |

*Primary Examiner* — Robert L Deberadinis
(74) *Attorney, Agent, or Firm* — Harness, Dickey & Pierce, P.L.C.

(57) ABSTRACT

A coil module includes a magnetic substance plate, a first coil, and a second coil. The magnetic substance plate includes a first area having a first magnetic permeability and a second area having a second magnetic permeability. The first coil is disposed on a surface of the magnetic substance plate. The second coil is disposed on the surface of the magnetic substance plate and partially overlapping the first coil. A portion of the first coil, not overlapping the second coil, is disposed on a surface of the first area, and a portion of the second coil, not overlapping the first coil, is disposed on a surface of the second area.

17 Claims, 13 Drawing Sheets

COIL MODULE AND WIRELESS POWER TRANSMISSION DEVICE USING THE SAME

CROSS-REFERENCE TO RELATED APPLICATION

This application claims the benefit under 35 USC 119(a) of Korean Patent Application No. 10-2017-0027827, filed on Mar. 3, 2017 in the Korean Intellectual Property Office, the entire disclosure of which is incorporated herein by reference for all purposes.

BACKGROUND

1. Field

The following description relates to a coil module and to a wireless power transmission device using the same.

2. Description of Related Art

In accordance with the development of wireless technology, various wireless functions, ranging from the transmission of data to the transmission of power, have been implemented. Particularly, wireless power transmission technology allowing an electronic device to be charged with power, even in a state of non-contact between the electronic device and a wireless power transmission device, has recently been developed.

Wireless power transmission devices may include a plurality of coils so that wireless power transmission devices may be efficiently magnetically coupled to wireless power reception devices.

Furthermore, for the wireless power transmission devices including the plurality of coils, such plurality of coils may be configured in such a manner that a portion of one of the coils overlaps with a portion of another of the coils, in order to prevent a shadow area from being generated by the coils during magnetic coupling.

However, because the coils overlap with each other, positions of the coils are set to be different from each other on a magnetic substance plate, inductance levels of each coil need to be set to be different. Thus, there is a limitation in which resonant tanks need to be separately configured for each coil.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Examples provide a coil module having a simple composition of a resonant circuit in such a manner that inductance levels of coils formed to overlap with each other are equal, and a wireless power transmission device using the coil module.

In accordance with an example, there may be provided a coil module, including: a magnetic substance plate including a first area having a first magnetic permeability and a second area having a second magnetic permeability; a first coil disposed on a surface of the magnetic substance plate; and a second coil disposed on the surface of the magnetic substance plate and partially overlapping the first coil, wherein a portion of the first coil, not overlapping the second coil, may be disposed on a surface of the first area, and a portion of the second coil, not overlapping the first coil, may be disposed on a surface of the second area.

An inductance level of the first coil may correspond to an inductance level of the second coil.

An end of the first coil and an end of the second coil may be connected to an end of a common capacitor, and the first coil may be connected in parallel to the second coil.

The magnetic substance plate may include the first area, the second area, and a third area disposed between the first area and the second area and including a further portion of the second coil, which overlaps with the first coil on a surface of the third area, and wherein the third area may include one of the first magnetic permeability and the second magnetic permeability.

The magnetic substance plate may include the first area, the second area, and a third area disposed between the first area and the second area and including a further portion of the second coil, which overlaps with the first coil on a surface of the third area, and wherein a portion of the third area may include the first magnetic permeability and the remaining portion of the third area may include the second magnetic permeability.

The first magnetic permeability may be lower than the second magnetic permeability.

The magnetic substance plate may include the first area, the second area, and a third area disposed between the first area and the second area and including a third magnetic permeability, and wherein the third magnetic permeability may be different from the first magnetic permeability and the second magnetic permeability.

The first magnetic permeability may correspond to the second magnetic permeability.

The third magnetic permeability may be higher than the first magnetic permeability and the second magnetic permeability.

An inductance level of the second coil may be different from that of the first coil, and the second coil and the first coil may be separately connected to capacitors having different levels of capacitance to form a resonant circuit having same resonance characteristics between the first coil and the second coil.

An overall degree of magnetic permeability of the magnetic substance plate may be equal, an inductance level of the first coil may be different from an inductance level of the second coil.

The inductance level of the second coil may be higher than the inductance level of the first coil.

In a portion of the second coil that overlaps with a portion of the first coil, a distance between the magnetic substance plate and a central portion of the second coil may be increased by d1, where d1 may be a distance between a central portion of the first coil and the central portion of the second coil.

In accordance with an example, there may be provided a wireless power transmission device, including: a coil module including a magnetic substance plate and coils overlapping each other, and disposed on a surface of the magnetic substance plate; a common capacitor including an end connected to ends of the coils; and an inverter including switches and supplying an alternating current (AC) power current to the common capacitor and the coil module according to a switching operation of the switches, wherein the magnetic substance plate may include areas having different degrees of magnetic permeability.

The coil module may include a magnetic substance plate including a first area having a first magnetic permeability and a second area having a second magnetic permeability, a first coil disposed on a surface of the magnetic substance plate, and a second coil disposed on the surface of the magnetic substance plate and partially overlapping the first coil, and wherein a portion of the first coil, not overlapping the second coil, being disposed on a surface of the first area and a portion of the second coil, not overlapping the first coil, being disposed on a surface of the second area.

An inductance level of the first coil may correspond to an inductance level of the second coil.

The first coil may be connected in parallel to the second coil.

The portion of the second coil may be disposed on the surface of the magnetic substance plate, a further portion of the second coil may be disposed on a surface of a further portion of the first coil, and the first magnetic permeability of the magnetic substance plate may be lower than the second magnetic permeability of the magnetic substance plate.

The magnetic substance plate may include the first area, the second area, and a third area disposed between the first area and the second area and including a third magnetic permeability, and wherein the third magnetic permeability may be different from the first magnetic permeability and the second magnetic permeability.

The first magnetic permeability may be equal to the second magnetic permeability, and the third magnetic permeability may be higher than the first magnetic permeability and the second magnetic permeability.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative sizes, proportions, and depictions of elements in the drawings may be exaggerated for clarity, illustration, and convenience.

DETAILED DESCRIPTION

Figure 1:
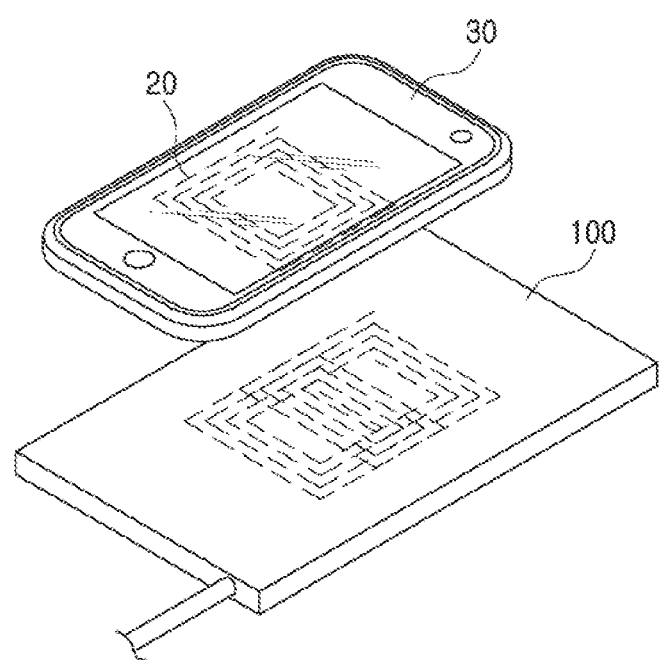
FIG. 1 is a view of a wireless power transmission device, according to an example.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Throughout the specification, it will be understood that when an element, such as a layer, region or wafer (substrate), is referred to as being "on," "connected to," or "coupled to" another element, it can be directly "on," "connected to," or "coupled to" the other element or other elements intervening therebetween may be present. In contrast, when an element is referred to as being "directly on," "directly connected to," or "directly coupled to" another element, there may be no elements or layers intervening therebetween. Like numerals refer to like elements throughout. As used herein, the term "and/or" includes any and all combinations of one or more of the associated listed items.

Spatially relative terms such as "above," "upper," "below," and "lower" may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes shown in the drawings may occur. Thus, the examples described herein are not limited to the specific shapes shown in the drawings, but include changes in shape that occur during manufacturing.

The features of the examples described herein may be combined in various ways as will be apparent after an understanding of the disclosure of this application. Further, although the examples described herein have a variety of configurations, other configurations are possible as will be apparent after an understanding of the disclosure of this application.

FIG. 1 is a view of a wireless power transmission device, according to an example.

With reference to FIG. 1, a wireless power transmission device 100 is magnetically coupled to a wireless power reception device 20 through, for example, magnetic resonance or magnetic induction. The wireless power transmission device 100 is disposed to be adjacent to the wireless power reception device 20 to wirelessly transmit power.

The wireless power reception device 20 supplies power that is received to an electronic device 30. The wireless power reception device 20 is provided or disposed as a separate device present as a component of the electronic device 30 or is disposed to be electrically connected to the electronic device 30.

The wireless power transmission device 100 includes a plurality of coils to increase a degree of freedom in magnetic coupling with respect to the wireless power reception device 20 or to expand a charging area thereof.

In an example illustrated in FIG. 1, two coils are illustrated as overlapping. However, in an alternative configuration, the number of coils may be three or more.

In a different configuration from the example illustrated in FIG. 1, in an example in which two coils are disposed in the wireless power transmission device 100 to be spaced apart from each other, a shadow area having a relatively low degree of magnetic coupling is generated in an area between the two coils. Thus, portions of the two coils of the wireless power transmission device 100 overlap, thus, increasing the degree of freedom in magnetic coupling.

Further, in an example in which the two coils are formed in the wireless power transmission device 100 to overlap, a spacing distance between the magnetic substance plate and each coil is set or configured to be different. Thus, in consideration of a relationship between magnetic permeability of a magnetic substance and inductance of a coil, inductance levels of a plurality of coils are set to correspond to each other, that is, to be substantially equal. However, magnetic substances having different degrees of magnetic permeability are disposed in a portion of each coil to control an entirety of inductance levels of a coil module. Descriptions thereof will be provided in more detail with reference to FIGS. 3 to 9, hereinafter.

Figure 2:
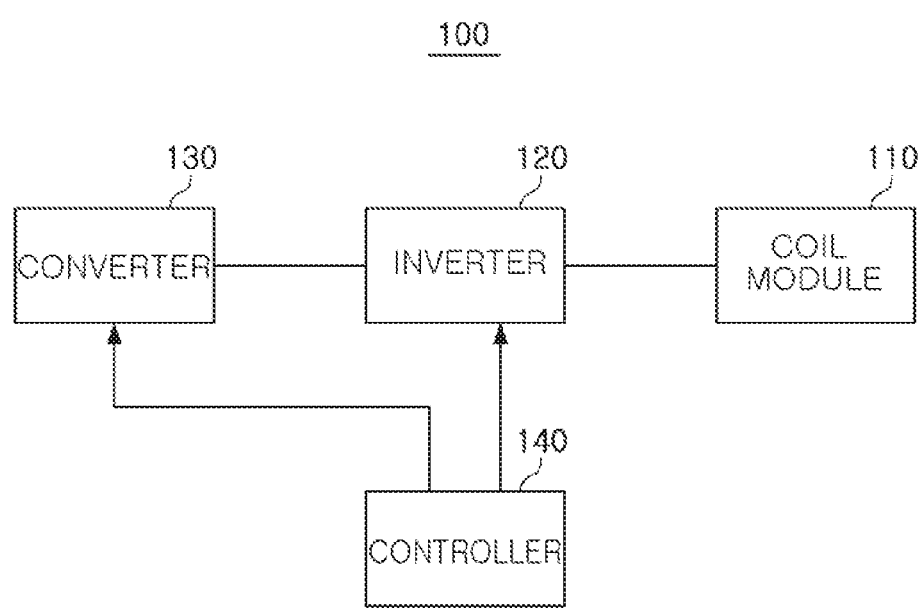
FIG. 2 is a block diagram of a wireless power transmission device, according to an example.

FIG. 2 is a block diagram of a wireless power transmission device and each component of a wireless power transmission device, in accordance to an example.

With reference to FIG. 2, a wireless power transmission device 100 includes a coil module 110, an inverter 120, a converter 130, and a controller 140.

The converter 130 receives direct current (DC) power or alternating current (AC) power and generates a specific level of DC power therefrom.

The controller 140 controls a switching operation of the inverter 120. The inverter 120 includes a plurality of switches. The inverter 120 generates an AC power current from DC power supplied from the converter 130, according to a switching operation of the switches that is controlled by the controller 140, and supplies the AC power current to the coil module 110.

The coil module 110 transmits power wirelessly by being magnetically coupled to a receiving coil of a wireless power reception device based on a DC current.

As described above, the coil module 110 includes the magnetic substance plate having different degrees of magnetic permeability depending on an area and a plurality of coils disposed thereon. According to an example, the coil module 110 may further include a capacitor connected to the plurality of coils to form an inductance-capacitance (LC) resonant circuit.

Hereinafter, with reference to FIGS. 3 to 8, various examples of a coil module will be described. FIGS. 3 to 8 illustrate a coil module having two coils as an example. However, the coil module is merely an example and may have three or more coils.

Figure 3:
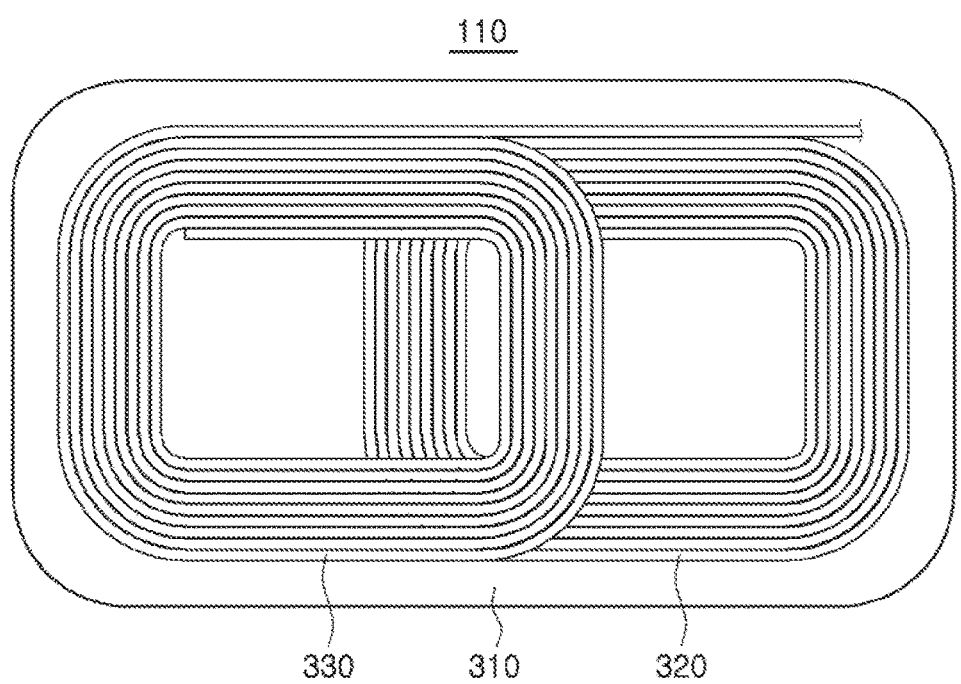
FIG. 3 is a top view illustrating an example of a coil module, according to an example.
Figure 4:
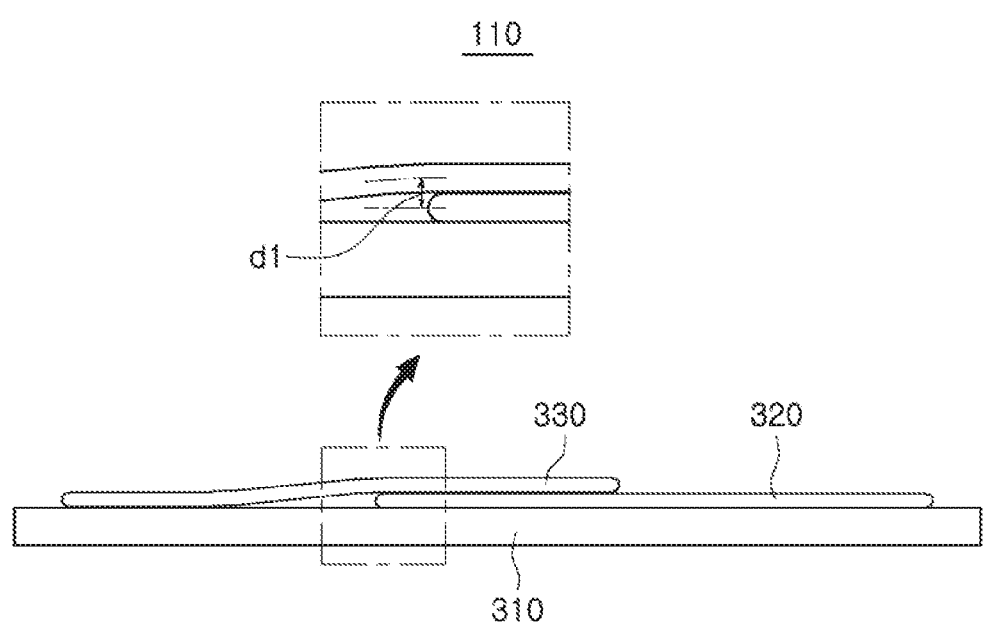
FIG. 4 is a front view illustrating an example of the coil module illustrated in FIG. 3.

FIG. 3 is a top view illustrating an example of a coil module, according to an example. FIG. 4 is a front view illustrating the coil module illustrated in FIG. 3, according to an example.

With reference to FIGS. 3 and 4, the coil module includes a magnetic substance plate 310 and a plurality of coils 320 and 330 disposed on a surface thereof. The coil module may also include a circuit board including a common capacitor, which is not illustrated.

A portion of a first coil 320 overlaps with a portion of a second coil 330. The first coil 320 and the second coil 330 are disposed on a surface of the magnetic substance plate 310.

As illustrated in an example, a portion of the second coil 330 overlaps with an upper surface of the first coil 320. In other words, an entirety of the first coil 320 is provided or disposed on a surface of the magnetic substance plate 310, so that one surface of the first coil 320 is in contact with the surface of the magnetic substance plate 310. A portion of the second coil 330 is provided or disposed on the other surface of the first coil 320, while the remaining portion of the second coil 330 is provided or disposed on the surface of the magnetic substance plate 310.

As such, in an example in which the second coil 330 is disposed to cover the upper surface of the first coil 320, a distance between the second coil 330 and the magnetic substance plate 310 changes. In other words, as illustrated in an enlarged view of FIG. 4, in an example in which the second coil 330 is disposed on the upper surface of the first coil 320, a distance between the magnetic substance plate 310 and a central portion of the second coil 330 is increased by d1, where d1 is a distance between a central portion of the first coil 320 and the central portion of the second coil 330.

Thus, in an example in which the second coil 330 is used and disposed on an upper surface of the first coil 320, according to a change in a distance between the magnetic substance plate 310 and the first coil 320, an overall inductance level determined by the second coil 330 and the magnetic substance plate 310 may be variable.

In other words, because a distance between the first coil 320 and the magnetic substance plate 310 is maintained to be uniform or constant, in an example in which the first coil 320 is used as a transmitting coil, an overall inductance level determined by an inductance level of the first coil 320 and a degree of magnetic permeability of the magnetic substance plate 310 is maintained at a specific value.

On the other hand, because the second coil 330 is disposed to be spaced apart at a spacing distance from the magnetic substance plate 310, an overall inductance level determined by an inductance level of the second coil 330 and the degree of magnetic permeability of the magnetic substance plate 310 is reduced due to the spacing distance.

In a comparative example in which an overall degree of magnetic permeability of the magnetic substance plate 310 is equal, in order to compensate for a change in the overall inductance level due to the spacing distance between the second coil 330 and the magnetic substance plate 310, the inductance level of the second coil 330 is set to be higher than that of the first coil 320.

As compared with the first coil 320 having a uniform distance with respect to the magnetic substance plate 310, the second coil 330 has a nonuniform distance with respect to the magnetic substance plate 310, and a portion of the second coil 330 is disposed to be spaced apart therefrom. Therefore, in order to have a uniform overall inductance level, the inductance level of the second coil 330 is set to be higher than that of the first coil 320 to compensate for a reduction in the overall inductance level, due to a spacing distance between the second coil 330 and the magnetic substance plate 310. Furthermore, in an example in which the inductance level of the second coil 330 is set to be different from that of the first coil 320, in order to form an LC resonant circuit having the same resonance characteristics, the first coil 320 and the second coil 330 are separately connected to capacitors having different levels of capacitance.

In an example in which the overall degree of magnetic permeability of the magnetic substance plate 310 is equal, an inductance level of each coil is different, so that a capacitor corresponding to an inductance level of each coil is separately implemented.

Also, in an example, inductance levels of the first coil 320 and the second coil 330 are set to correspond to each other, and magnetic substance plates having different degrees of magnetic permeability are used by area, in order to compensate for the spacing distance between the second coil 330 and the magnetic substance plate 310. Thus, in an example in which a plurality of coils overlap with each other, all of the coils may have the same inductance level. Thus, the configuration of a plurality of LC resonant circuits is effectively facilitated, and the LC resonant circuits are formed using a single common capacitor.

Hereinafter, with reference to FIGS. 5 to 8, various examples of a magnetic substance plate having different degrees of magnetic permeability by area thereof will be described.

Figure 5:
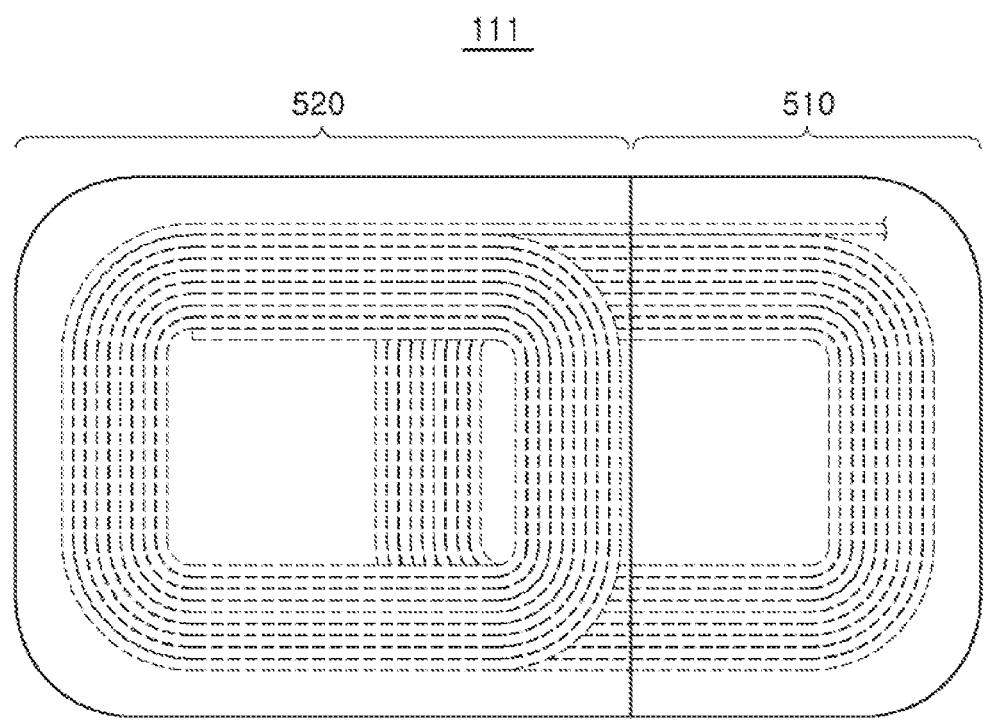
FIG. 5 is a top view illustrating a magnetic substance plate divided into different areas of the coil module illustrated in FIG. 3, according to an example.
Figure 6:
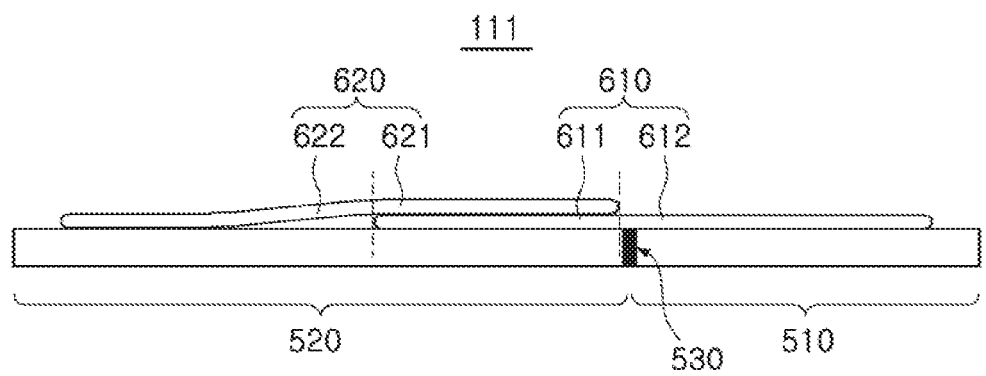
FIG. 6 is a front view illustrating the magnetic substance plate divided into different areas of the coil module illustrated in FIG. 5, according to an example.

FIG. 5 is a top view illustrating a magnetic substance plate divided into different areas of a coil module illustrated in FIG. 3, in accordance with an example. FIG. 6 is a front view illustrating the magnetic substance plate divided into different areas in an example of a coil module illustrated in FIG. 5.

With reference to FIGS. 5 and 6, the magnetic substance plate is divided into two areas, portions, or zones. In addition, a portion 611 of a first coil 610 overlaps with a portion 621 of a second coil 620.

The magnetic substance plate is divided into a first area 510 corresponding to a remaining portion 612 of the first coil 610, not overlapping the second coil 620, and a second area 520 excluding the first area 510.

In this example, a degree of magnetic permeability of the first area 510 is different from that of the second area 520.

For example, the degree of magnetic permeability of the first area 510 in the magnetic substance plate is lower than that of the second area 520. In the first area 510, the first coil 610 is uniformly disposed on the magnetic substance plate, while in the second area 520, there is a section in which the second coil 620 is disposed to be spaced apart from the magnetic substance plate. Thus, in order to compensate for a spacing distance between the second coil 620 and the magnetic substance plate, a degree of magnetic permeability of the magnetic substance plate in the second area 520 is set to be relatively higher than the degree of magnetic permeability of the magnetic substance plate in the first area 510. Thus, even in an example in which the second coil 620 is disposed to be spaced apart from the magnetic substance plate, a change in an inductance level due to the spacing distance therebetween is compensated for due to a change in a degree of magnetic permeability of the magnetic substance plate.

In addition, an overall inductance level determined or defined by a coil and the magnetic substance plate is expressed using formulas below.

$$TL1 = \mu 1 * f(L11) + \mu 2 * f(L12) \quad \text{[Formula 1]}$$

$$TL2 = \mu 2 * f(L21) + \mu 2 * f(L22) \quad \text{[Formula 2]}$$

Formula 1 refers to an overall inductance level TL1 determined, output, generated, or defined by the first coil 610 and the magnetic substance plate, while Formula 2 refers to an overall inductance level TL2 determined, output, generated, or defined by the second coil 620 and the magnetic substance plate. Here, $\mu 1$ refers to a degree of magnetic permeability of the first area 510 in the magnetic substance plate, and $\mu 2$ refers to a degree of magnetic permeability of the second area 520 in the magnetic substance plate.

L11 refers to the remaining portion 612 of the first coil 610, not overlapping or separate from the second coil 620, L12 refers to the portion 611 of the first coil 610, overlapping the second coil 620, L21 refers to the portion 621 of the second coil 620, overlapping the first coil 610, and L22 refers to the remaining portion 622 of the second coil 620, not overlapping or separate from the first coil 610.

A function f(x) is a function related to inductance of the coil. The function f(x) is a function having a distance between the magnetic substance plate and the coil as a single variable.

In an example, degrees of magnetic permeability $\mu 1$ and $\mu 2$ of each area of the magnetic substance plate are determined so that TL1 and TL2, calculated using formulas described above, are equal, and inductance levels of the first coil 610 and the second coil 620 are equal.

In detail, in an example in which sizes of the first coil 610 and the second coil 620 are equal, $\mu 2$, the degree of magnetic permeability of the second area 520 in the magnetic substance plate may be set to be higher than $\mu 1$, the degree of magnetic permeability of the first area 510, thereby satisfying conditions described above. However, in an example in which forms or sizes of the first coil 610 and the second coil 620 are different, a degree of magnetic permeability of each area in the magnetic substance plate may be calculated differently, depending thereon.

In an example, an insulating gap 530 is formed between the first area 510 and the second area 520 of the magnetic substance plate by an insulating material, as illustrated in FIG. 6. Each area of the magnetic substance plate, having different degrees of magnetic permeability, is more clearly divided in such a manner that interference between areas of the magnetic substance plate is prevented by insulation between areas of the magnetic substance plate, having different degrees of magnetic permeability.

Figure 7:
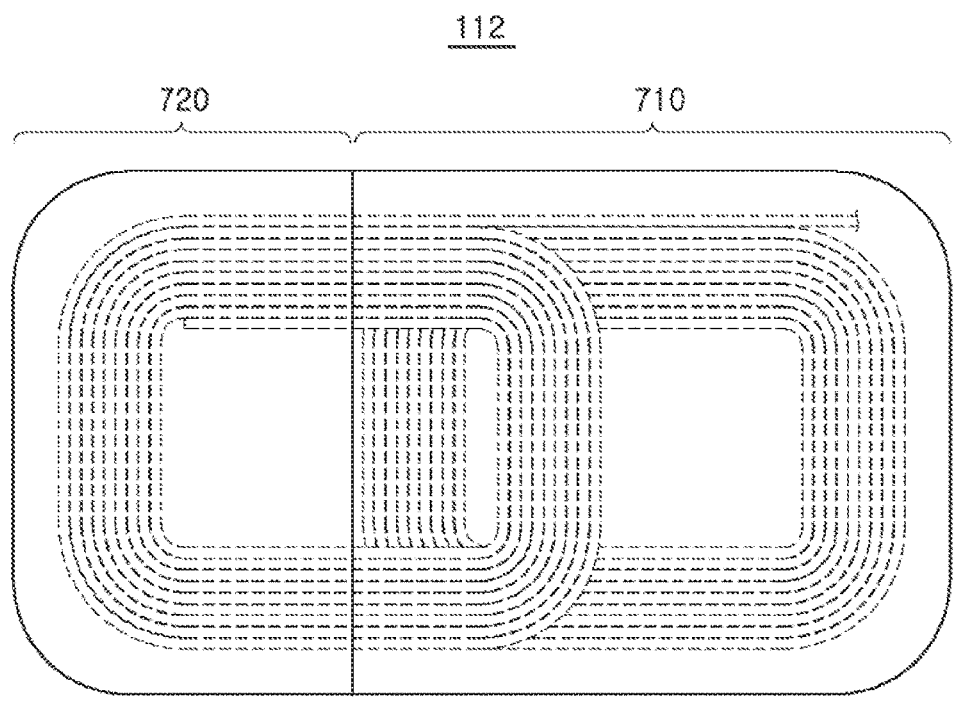
FIG. 7 is a top view illustrating the magnetic substance plate divided into different areas of the coil module illustrated in FIG. 3, according to an example.
Figure 8:
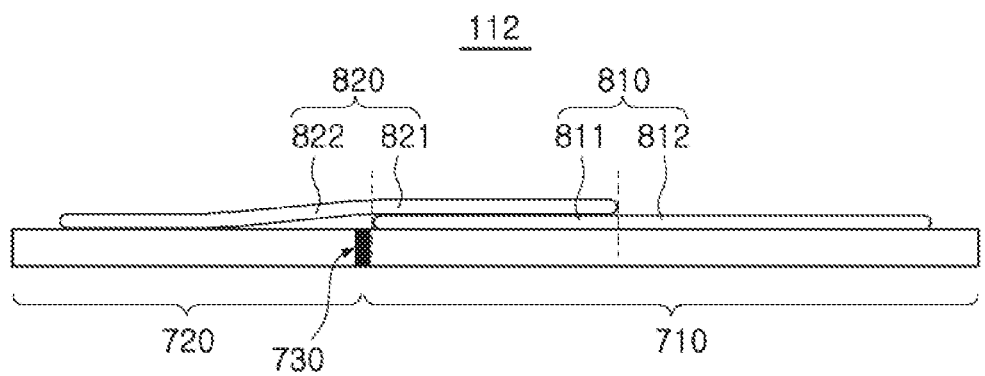
FIG. 8 is a front view illustrating the magnetic substance plate divided into different areas of the coil module illustrated in FIG. 7, according to an example.

FIG. 7 is a top view illustrating a magnetic substance plate divided into different areas in another example of a coil module illustrated in FIG. 3. FIG. 8 is a front view illustrating the magnetic substance plate divided into different areas in another example of a coil module illustrated in FIG. 7.

Another example of the coil module illustrated in FIGS. 7 and 8 is an example different from an example illustrating an example in which areas of the magnetic substance plate are divided.

A portion 811 of a first coil 810 overlaps a portion 821 of a second coil 820. The magnetic substance plate may be divided into a first area 710 corresponding to the first coil 810 and a second area 720, excluding the first area 710. In other words, the second area 720 is an area corresponding to a remaining portion 822 of the second coil 720, not overlapping or separate from the first coil 810.

In this example, a degree of magnetic permeability of the first area 710 is different from that of the second area 720. For example, the degree of magnetic permeability of the second area 720 in the magnetic substance plate is higher than that of the first area 710. As illustrated above, there is a section in which the second coil 820 is disposed to be spaced apart from the magnetic substance plate in the second area 720. Thus, in order to compensate for a spacing distance between the second coil 820 and the magnetic substance plate, a degree of magnetic permeability of the magnetic substance plate in the second area 720 is set to be relatively high from the degree of magnetic permeability of the magnetic substance plate in the first area 710. A description thereof may be easily understood with reference to FIGS. 5 to 6.

In an example, as illustrated in FIG. 8, an insulating gap 730 is formed between the first area 710 and the second area 720 of the magnetic substance plate using an insulating material.

In examples described with reference to FIGS. 5 to 7, the magnetic substance plate was described by dividing the magnetic substance plate into two areas; however, this is merely an example. Thus, in examples described with reference to FIGS. 5 to 7, the magnetic substance plate may be described by dividing the magnetic substance plate into three or more areas. In other words, the magnetic substance plate may include a first area having a first magnetic permeability, a second area having a second magnetic permeability, and a third area disposed between the first area and the second area and including a further portion of the second coil 820, overlapping the first coil 810, on a surface thereof. In this example, the third area may have either the first magnetic permeability or the second magnetic permeability.

Figure 9:
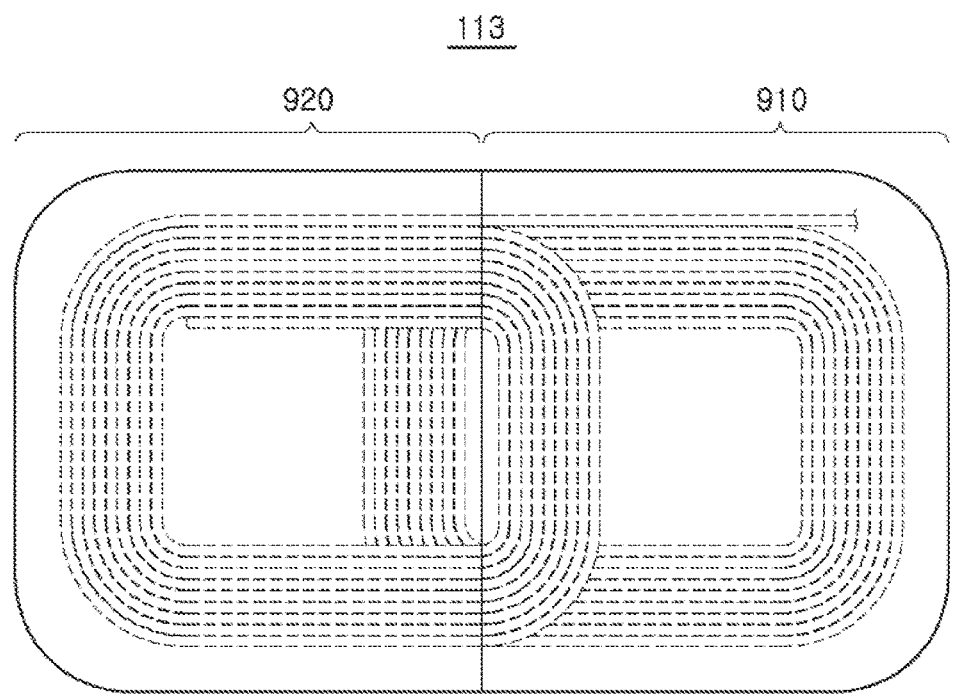
FIG. 9 is a top view illustrating the magnetic substance plate divided into different areas of the coil module illustrated in FIG. 3, according to an example.
Figure 10:
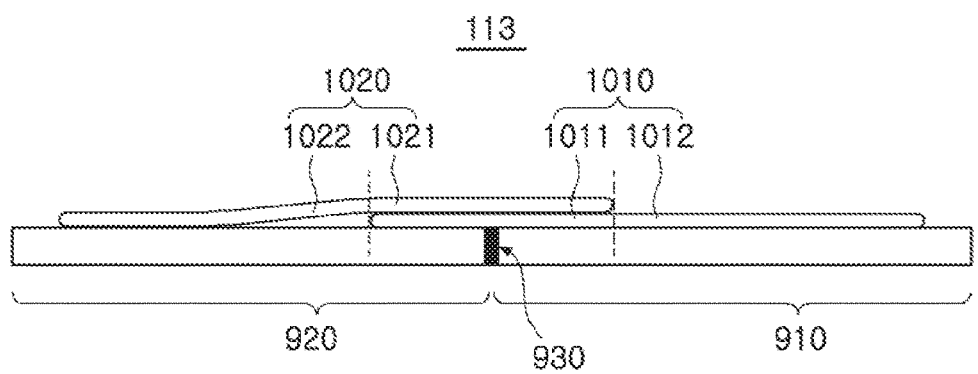
FIG. 10 is a front view illustrating the magnetic substance plate divided into different areas of the coil module illustrated in FIG. 9, according to an example.

FIG. 9 is a top view illustrating a magnetic substance plate divided into different areas in another example of a coil module illustrated in FIG. 3. FIG. 10 is a front view illustrating the magnetic substance plate divided into different areas in another example of a coil module illustrated in FIG. 9.

Another example of the coil module illustrated in FIGS. 9 and 10 is an example different from examples illustrating an example in which areas of the magnetic substance plate are divided.

A portion 1011 of a first coil 1010 overlaps a portion 1021 of a second coil 1020 as described above.

Furthermore, the magnetic substance plate is divided into two areas at a point or a position in an area corresponding to the portion 1011 of the first coil 1010, overlapping the second coil 1020. In detail, a first area 910 and a second area 920 of the magnetic substance plate are formed in a symmetrical manner.

Even in this example, a degree of magnetic permeability of the first area 910 in the magnetic substance plate is different from that of the second area 920. In other words, as described above, degrees of magnetic permeability of each area in the magnetic substance plate are set to be different so that inductance levels of a coil in each area are equal, and an overall inductance level determined by an inductance level of the coil and a degree of magnetic permeability of the magnetic substance plate are equal.

In an example, as illustrated in FIG. 10, an insulating gap 930 is formed between the first area 910 and the second area 920 of the magnetic substance plate by an insulating material.

In examples described above with reference to FIG. 9, the magnetic substance plate is described by dividing the magnetic substance plate into two areas. However, as previously describe, the magnetic substance plate may be divided into multiple areas. Thus, in examples described with reference to FIG. 9, the magnetic substance plate is described by dividing the magnetic substance plate into three areas. In other words, the magnetic substance plate may include a first area having a first magnetic permeability, a second area having a second magnetic permeability, and a third area disposed between the first area and the second area and including a further portion of the second coil 1020, overlapping the first coil 1010, on a surface thereof. In this example, a portion of the third area has the first magnetic permeability, while the remaining portion of the third area has the second magnetic permeability.

Figure 11:
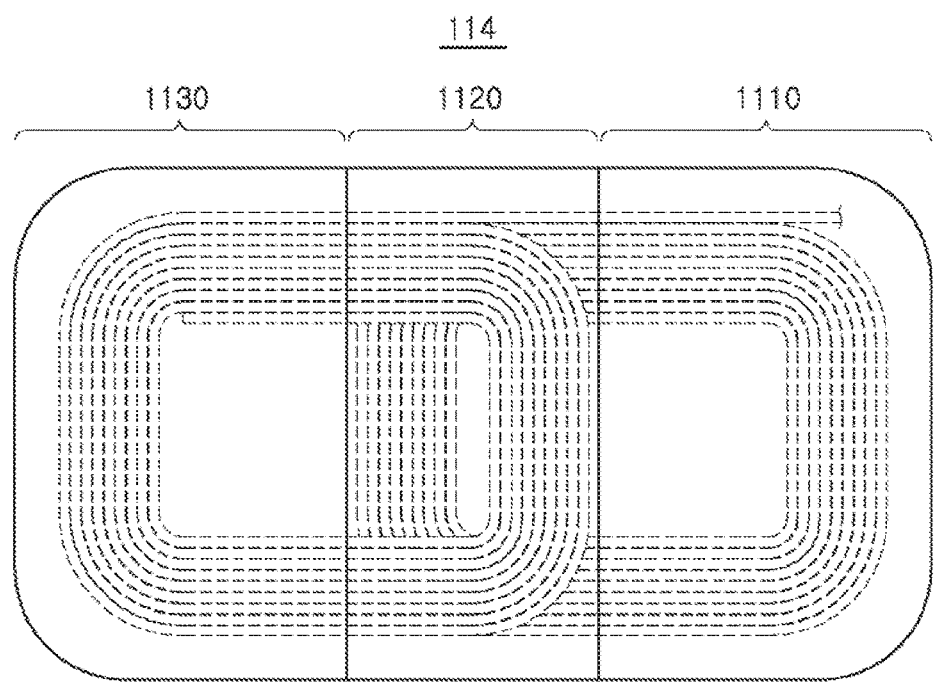
FIG. 11 is a top view illustrating the magnetic substance plate divided into different areas of the coil module illustrated in FIG. 3, according to an example.
Figure 12:
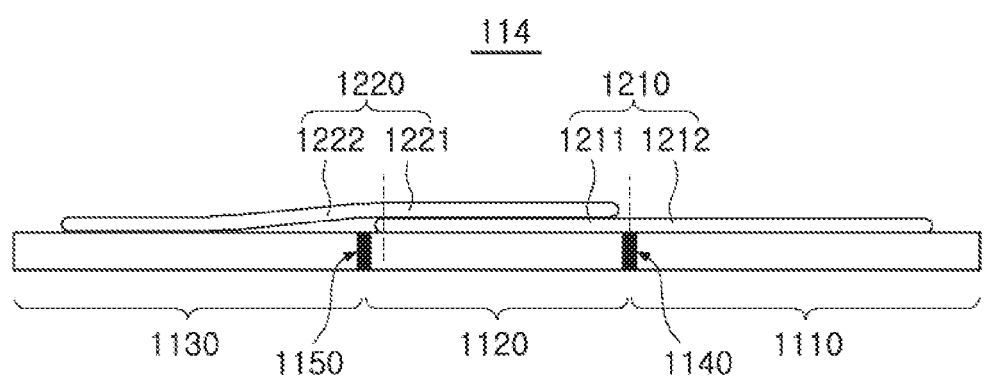
FIG. 12 is a front view illustrating the magnetic substance plate divided into different areas of the coil module illustrated in FIG. 11, according to an example.

FIG. 11 is a top view illustrating a magnetic substance plate divided into different areas of a coil module illustrated in FIG. 3, in accordance with an example. FIG. 12 is a front view illustrating the magnetic substance plate divided into different areas in another example of a coil module illustrated in FIG. 11.

With reference to FIGS. 11 and 12, the magnetic substance plate is divided into a first area 1110 corresponding to a portion 1211 of a first coil 1210, a second area 1130 corresponding to an area in which the first coil 1210 overlaps a second coil 1220, and a third area 1120 corresponding to a portion 1221 of the second coil 1220.

In an example illustrated in FIG. 12, because in the first area 1110 and the third area 1120, a coil adheres to a surface of the magnetic substance plate, the first area 1110 and the third area 1120 have the same degree of magnetic permeability.

On the other hand, because the portion 1211 of the first coil 1210 and the portion 1221 of the second coil 1220 are stacked in the second area 1130, a degree of magnetic permeability of the second area 1130 is different from that of the first area 1110 or that of the third area 1120. For example, the degree of magnetic permeability of the second area 1130 is higher than that of the first area 1110 or that of the third area 1120.

As illustrated in FIG. 8, each area of the magnetic substance plate include insulating gaps 1140 and 1150 formed using an insulating material, as described above.

As described above, in an example, a degree of magnetic permeability of the magnetic substance plate is set to be different by area, thereby allowing inductance levels of a coil to be equal.

Figure 13:
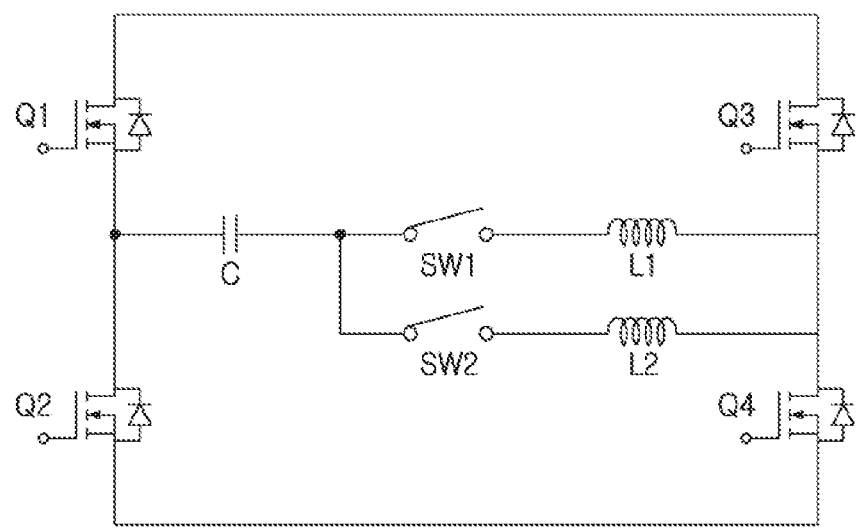
FIG. 13 is a circuit diagram illustrating a wireless power transmission device using a common capacitor, according to an example.

FIG. 13 is a circuit diagram illustrating a wireless power transmission device using a common capacitor, according to an example. FIG. 13 illustrates a coil module of a wireless power transmission device and a circuit structure of an inverter.

With reference to FIG. 13, the coil module includes a first coil L1 and a second coil L2. A common capacitor C is connected to an end of the first coil L1 and an end of a second coil L2, in series. In other words, the first coil L1 is connected to the second coil L2 in parallel, while the end of the first coil L1 and the end of the second coil L2 connected to each other in parallel, are connected to an end of the common capacitor C.

As described above, in an example, even in an example in which the first coil L1 partially overlaps the second coil L2, degrees of magnetic permeability of a magnetic substance plate may be set to be different by area, so that inductance levels of the first coil L1 and the second coil L2 may be set to be equal. Thus, a wireless power transmission device forms an LC resonant circuit by selectively determining a coil connected to the common capacitor C.

As compared with a comparative example in which, in an example in which respective coils have different inductance levels, separate capacitors are disposed by coil, a single capacitor forms a plurality of LC resonant circuits, thereby reducing costs and enabling for miniaturization thereof.

As set forth above, according to examples, a coil module has a simple composition of a resonant circuit in such a manner that inductance levels of a plurality of coils formed to overlap are equal.

In addition, a low power, wide area communications module forms a plurality of resonant circuits using a single common capacitor, thereby enabling for miniaturization of a wireless power transmission device and reducing a manufacturing cost thereof.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A coil module, comprising:
a magnetic substance plate comprising a first area having a first magnetic permeability and a second area having a second magnetic permeability;
a first coil disposed on a surface of the magnetic substance plate; and
a second coil disposed on the surface of the magnetic substance plate and partially overlapping the first coil,
wherein a portion of the first coil, not overlapping the second coil, is disposed on a surface of the first area, and a portion of the second coil, not overlapping the first coil, is disposed on a surface of the second area.

2. The coil module of claim 1, wherein an inductance level of the first coil corresponds to an inductance level of the second coil.

3. The coil module, claim 2, wherein an end of the first coil and an end of the second coil are connected to an end of a common capacitor, and the first coil is connected in parallel to the second coil.

4. The coil module of claim 1, wherein the magnetic substance plate comprises the first area, the second area, and a third area disposed between the first area and the second area and comprising a further portion of the second coil, which overlaps with the first coil on a surface of the third area, and wherein the third area comprises one of the first magnetic permeability and the second magnetic permeability.

5. The coil module of claim 1, wherein the magnetic substance plate comprises the first area, the second area, and a third area disposed between the first area and the second area and comprising a further portion of the second coil, which overlaps with the first coil on a surface of the third area, and wherein a portion of the third area comprises the first magnetic permeability and the remaining portion of the third area comprises the second magnetic permeability.

6. The coil module of claim 1, wherein the first magnetic permeability is lower than the second magnetic permeability.

7. The coil module of claim 1, wherein the magnetic substance plate comprises the first area, the second area, and a third area disposed between the first area and the second area and comprising a third magnetic permeability, and wherein the third magnetic permeability is different from the first magnetic permeability and the second magnetic permeability.

8. The coil module of claim 7, wherein the first magnetic permeability corresponds to the second magnetic permeability.

9. The coil module of claim 7, wherein the third magnetic permeability is higher than the first magnetic permeability and the second magnetic permeability.

10. The coil module of claim 1, wherein, in a portion of the second coil that overlaps with a portion of the first coil, a distance between the magnetic substance plate and a central portion of the second coil is increased by d1, where d1 is a distance between a central portion of the first coil and the central portion of the second coil.

11. A wireless power transmission device, comprising:
a coil module comprising a magnetic substance plate and coils overlapping each other, and disposed on a surface of the magnetic substance plate;
a common capacitor comprising an end connected to ends of the coils; and
an inverter comprising switches and supplying an alternating current (AC) power current to the common capacitor and the coil module according to a switching operation of the switches, wherein the magnetic substance plate comprises areas having different degrees of magnetic permeability.

12. The wireless power transmission device of claim 11, wherein the coil module comprises a magnetic substance plate comprising a first area having a first magnetic permeability and a second area having a second magnetic permeability, a first coil disposed on a surface of the magnetic substance plate, and a second coil disposed on the surface of the magnetic substance plate and partially overlapping the first coil, and wherein a portion of the first coil, not overlapping the second coil, being disposed on a surface of the first area and a portion of the second coil, not overlapping the first coil, being disposed on a surface of the second area.

13. The wireless power transmission device of claim 12, wherein an inductance level of the first coil corresponds to an inductance level of the second coil.

14. The wireless power transmission device of claim 13, wherein the first coil is connected in parallel to the second coil.

15. The wireless power transmission device of claim 12, wherein the portion of the second coil is disposed on the surface of the magnetic substance plate, a further portion of the second coil is disposed on a surface of a further portion of the first coil, and the first magnetic permeability of the magnetic substance plate is lower than the second magnetic permeability of the magnetic substance plate.

16. The wireless power transmission device of claim 12, wherein the magnetic substance plate comprises the first area, the second area, and a third area disposed between the first area and the second area and comprising a third magnetic permeability, and wherein the third magnetic permeability is different from the first magnetic permeability and the second magnetic permeability.

17. The wireless power transmission device of claim 16, wherein the first magnetic permeability is equal to the second magnetic permeability, and the third magnetic permeability is higher than the first magnetic permeability and the second magnetic permeability.

* * * * *